United States Patent [19]
Nishimura et al.

[11] Patent Number: 5,678,090
[45] Date of Patent: Oct. 14, 1997

[54] ZOOM-TYPE VIEWFINDER DEVICE HAVING A MULTI-SECTIONED VIEWFINDER CAM

[75] Inventors: Tomoki Nishimura, Kawasaki; Kiyosada Machida, Urawa; Hiroshi Wakabayashi, Yokohama, all of Japan

[73] Assignee: Nikon Corporation, Tokyo, Japan

[21] Appl. No.: 377,630

[22] Filed: Jan. 25, 1995

[30] Foreign Application Priority Data

Feb. 4, 1994 [JP] Japan .................................. 6-012985

[51] Int. Cl.$^6$ .............................................. G03B 13/10
[52] U.S. Cl. ............................................. 396/379; 74/567
[58] Field of Search ........................................ 354/221, 222, 354/106; 74/567; 396/373, 374, 383, 379

[56] References Cited

U.S. PATENT DOCUMENTS

| | | | |
|---|---|---|---|
| 4,452,103 | 6/1984 | Lijewski et al. | 74/567 X |
| 4,652,104 | 3/1987 | Harvey | 354/106 |
| 4,945,372 | 7/1990 | Higuchi et al. | 354/222 X |
| 5,036,346 | 7/1991 | Hatamori et al. | 354/195.12 |
| 5,115,267 | 5/1992 | Kondo et al. | 354/221 |
| 5,257,778 | 11/1993 | Coombs et al. | 74/567 X |

FOREIGN PATENT DOCUMENTS 52-56041  12/1977  Japan.
4-70607   11/1992  Japan.

*Primary Examiner*—D. Rutledge

[57] ABSTRACT

A zoom-type viewfinder device which has a multi-sectioned viewfinder cam which rotates in connection with the zooming of a photographic zoom lens. The viewfinder cam has a cam, with at least one cam bevel, which is divided into a first cam component and a second cam component. The first cam component and the second cam component are joined to connect the respective cam bevels to form a cam bevel which wraps more than once around of the cylinder of the viewfinder cam. As the viewfinder cam is manufactured in multiple segments, each segment can be removed from its forming die in the longitudinal direction of the viewfinder cam, thereby providing smooth zooming and a blur free viewfinder image. Also, the inclinations of cam bevels, which are formed on the viewfinder cam, can be made more gradual, which reduces the required driving force. Therefore, a more compact motor can be used, resulting in a more compact camera. Moreover, the power consumption required by the motor is reduced, increasing the life of the camera battery.

18 Claims, 5 Drawing Sheets

ZOOM-TYPE VIEWFINDER DEVICE HAVING A MULTI-SECTIONED VIEWFINDER CAM

BACKGROUND OF THE INVENTION

1. Field of the Invention

The present invention relates to a zoom-type viewfinder device and in particular to a zoom-type viewfinder device for a camera which changes the magnification of the viewfinder in response to the zooming of a photographic zoom lens.

2. Description of the Related Art

Compact cameras which have a built-in photographic zoom lens benefit from using a zoom-type viewfinder device which changes magnification according to the zooming of the photographic zoom lens. Typically, a zoom-type viewfinder device changes magnification by driving a movable viewfinder lens, located inside the viewfinder, with a viewfinder cam which rotates in connection with the zooming of the photographic zoom lens.

FIG. 5 shows a conventional viewfinder cam 32 for driving a zoom-type viewfinder device. The conventional viewfinder cam 32 has a cam 34 formed on the circumference of a cylindrical member 33.

FIG. 6 is an expanded view of a conventional viewfinder cam 32 in accordance with the prior art showing the shape of the cam 34.

Typically, a conventional viewfinder cam 32 is manufactured by die forming, wherein the viewfinder cam 32 is removed from the die in the longitudinal direction of the viewfinder cam 32 after the forming of the viewfinder cam 32 by the die. If the viewfinder cam 32 is removed radially, parting lines are left on the cam surface, and due to burrs created by the parting lines, a cam follower pin will not operate smoothly, causing the viewfinder image to jump and become blurred. Therefore, it is necessary to keep the extended length of the viewfinder cam 32 within one 360 degrees rotation of the cylindrical member 33. If the extended length of the cam 34 exceeds one rotation of the cylindrical member, part of the cam 34 will interfere with the forming face of the die when removing the viewfinder cam 32 from the die, in the longitudinal direction of the viewfinder cam 32, after the forming of the viewfinder cam 32 by the die. This makes removal of the viewfinder cam 32 from the die impossible.

However, limiting the extended length of the cam 34 within one rotation of the cylindrical member 33 has several disadvantages. First, when the extended length of the cam 34 is shorter than the amount of movement of the viewfinder lens, the inclination of the cam 34 has to be raised in order to ensure the appropriate amount of movement of the viewfinder lens. As a result, the driving force required to rotate the viewfinder cam 32 becomes larger, which requires a larger drive motor, which increases the amount of energy needed to perform the zooming operation. Second, if the inclination of the cam 34 is gradual, so as to decrease the driving force which rotates the viewfinder cam 32, the outer diameter of the viewfinder cam 32 must be increased to ensure the appropriate extended length of the cam 34, and, as a result, the zoom-type viewfinder device as a whole becomes larger which requires more space within an already compact camera.

SUMMARY OF THE INVENTION

Accordingly, it is an object of the present invention to provide a zoom-type viewfinder device having a smaller viewfinder cam for driving a viewfinder lens in the zoom-type viewfinder device.

It is another object of the invention to provide a zoom-type viewfinder device having a smaller viewfinder cam having a cam bevel which has a gentle inclination.

It is a further object of the present invention to provide a zoom-type viewfinder device having a compact viewfinder cam which drives a viewfinder lens with a gently inclined cam.

It is yet another object of the invention to provide a viewfinder cam for a zoom-type viewfinder device having a viewfinder cam with a cam bevel formed by at least two cam segments formed on at least two cam components, so as to permit a cam bevel, which extends more than once around the circumference of the viewfinder cam, to be formed by die forming using multiple dies wherein the viewfinder cam may be removed in the longitudinal direction of the viewfinder cam after the forming of the viewfinder cam by the die.

It is a further object of the present invention to provide a viewfinder cam for a zoom-type viewfinder device, the viewfinder cam having a cam bevel formed by at least two cam components having a seam which is positioned in a section other than that corresponding to the section between the wide angle end and the telephoto end of the photographic zoom lens, so a smooth zoom operation can be achieved during zooming and the viewfinder image is not blurred.

It is yet another object of the present invention to provide a cam having multiple components which form a single cam bevel.

It is yet another object of the present invention to provide a method for producing a cam from multiple components which are die formed and are removed in a longitudinal direction from the die after they have been formed.

Additional objects and advantages of the invention will be set forth in part in the description which follows, and, in part, will be obvious from the description, or may be learned by practice of the invention.

Objects of the present invention are achieved in a zoom-type viewfinder device for use with a photographic zoom lens comprising at least one viewfinder lens having a cam pin dependent therefrom, a viewfinder cam having a cam extending around the circumference of the viewfinder cam, the cam having at least one cam bevel engaging the cam pin dependent from the at least one viewfinder lens so as to drive the at least one viewfinder lens to change the magnification of the zoom-type viewfinder, the viewfinder cam including a first cam component having a first cam segment forming a first part of the cam, and a second cam component connected to the first cam component, the second cam component having a second cam segment forming a second part of the cam.

Objects of the present invention are further achieved by a zoom-type viewfinder device for use with a photographic zoom lens comprising a first viewfinder lens having a cam pin dependent therefrom, a second viewfinder lens having a cam pin dependent therefrom, a viewfinder cam having a cam extending around the circumference of the viewfinder cam, the cam having a first and a second cam bevel, the first cam bevel engaging the cam pin dependent from the first viewfinder lens so as to drive the first viewfinder lens and the second cam bevel engaging the cam pin dependent from the second viewfinder lens so as to drive the second viewfinder lens, the viewfinder cam including a first cam component having a first cam segment forming a first part of the cam, the first part of the cam extending once around the viewfinder cam, a second cam component connected to the first cam component, the second cam component having a second cam segment forming a second part of the cam, the second part of the cam being continuous with the first part of the cam, and a gear component connected to the first cam component so as to rotate with the first and second cam components, the gear component having a gear which meshes with a gear on the photographic zoom lens so as to cause the viewfinder cam to rotate with the photographic zoom lens.

Objects of the present invention are also achieved by a zoom-type viewfinder device comprising a cylindrical viewfinder cam which rotates in connection with the zooming of a photographic zoom lens, the viewfinder cam having a cam bevel formed on a circumference, the cam bevel comprising two cam components, and at least one viewfinder lens positioned inside a viewfinder case so that it may move freely in the optical axis direction to change the magnification of the zoom-type viewfinder device, each of the at least one viewfinder lens having a cam pin dependent therefrom which is in contact with the cam bevel.

Objects of the present invention are also achieved by a viewfinder cam comprising a first cam component having a first cam segment forming a first part of an at least one cam bevel, and a second cam component connected to the first cam component, the second cam component having a second cam segment forming a second part of the at least one cam bevel.

Objects of the present invention are further achieved by a method for forming a cam with a cam bevel comprising forming a first cam component having a first cam bevel with a first die, removing the first cam component from the die in the longitudinal direction of the first cam component, forming a second cam component having a second cam bevel with a second die, removing the second cam component from the die in the longitudinal direction of the second cam component, and joining the first cam component to the second cam component to form the cam such that the first cam bevel and the second cam bevel join to form the cam bevel.

Objects of the present invention are also achieved in a zoom-type viewfinder device comprising a cylindrical viewfinder cam which rotates in connection with the zooming of a photographic zoom lens, the viewfinder cam having a cam bevel formed on a circumference, the cam bevel comprising two cam components, the seam between the cam components being positioned between the cam bevels in a section on the cam outside the picture taking range of the photographic zoom lens, and at least one viewfinder lens positioned inside a viewfinder case so that it may move freely in the optical axis direction to change the magnification of the zoom-type viewfinder device, each of the at least one viewfinder lens having a cam pin dependent therefrom which is in contact with the cam bevel.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
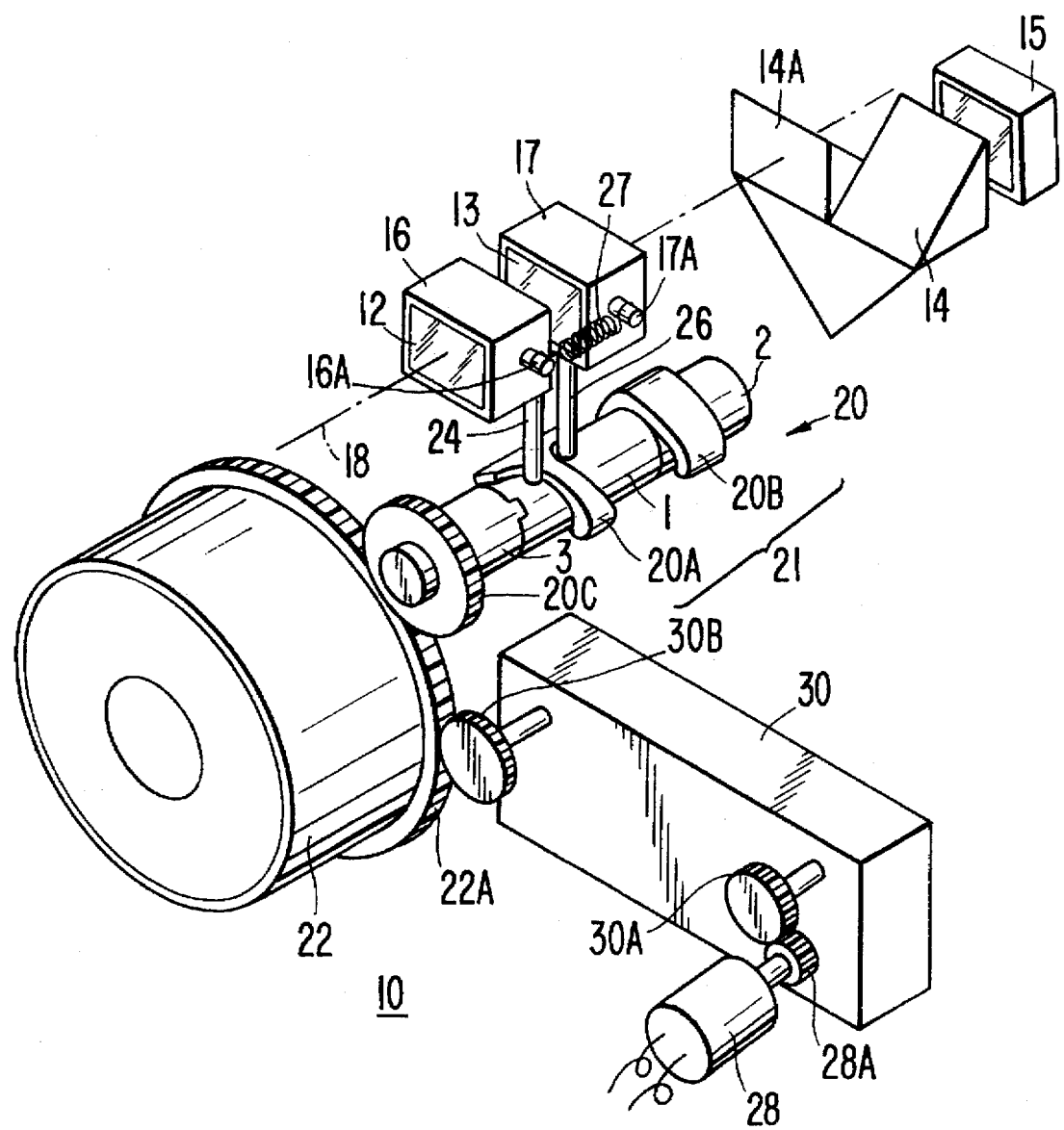
FIG. 1 is a perspective view of an optical system of a zoom-type viewfinder device in accordance with a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a perspective view of an optical system of a zoom-type viewfinder device in accordance with the first preferred embodiment of the present invention. A zoom-type viewfinder device 10 generally comprises a first viewfinder lens group 12 and a second viewfinder lens group 13 having a common optical axis 18, a prism 14 with an image-forming plane 14A, an ocular lens 15, and a viewfinder cam 20. The first viewfinder lens group 12 and the second viewfinder lens group 13 are driven along the common optical axis 18, inside a viewfinder case (not shown), by the viewfinder cam 20 which in turn is driven by the rotation of the lens barrel 22 of a photographic zoom lens (not shown).

The first viewfinder lens group 12 and the second viewfinder lens group 13 are held by a first holding rim 16 and a second holding rim 17, respectively. The first holding rim 16 and the second holding rim 17 are supported by holding members (not shown) within the viewfinder case. A pair of cam pins 24 and 26 are attached to the lower ends of the first holding rim 16 and the second holding rim 17, respectively. The viewfinder cam 20 is provided with two connected cam segments 20A and 20B which form a cam 21. The cam pins 24 and 26 each follow a cam bevel on opposite sides of the cam 21. Thus, in conjunction with the rotation of the viewfinder cam 20, the first holding rim 16 and the second holding rim 17 are cam-driven along the common optical axis 18. A pair of spring pegs 16A and 17A are attached to the first holding rim 16 and the second holding rim 17, respectively. An energy imparting spring 27 is attached between the spring pegs 16A and 17A to bias the cam pins 24 and 26 against the cam 21.

A gear 22A, secured to the lens barrel 22, transmits rotational force to a gear 20C provided on the viewfinder cam 20. The lens barrel is rotationally driven, via the gear 22A, by a motor 28 through a speed reducer 30 located to the side of the lens barrel 22. The driving force of the speed reducer 30 is transmitted from a gear 30A to the gear 22A via a gear group (not shown) inside the speed reducer 30 which terminates with a gear 30B. Preferably, the lens barrel 22 extension operation is performed in conjunction with the zooming operation.

Figure 2:
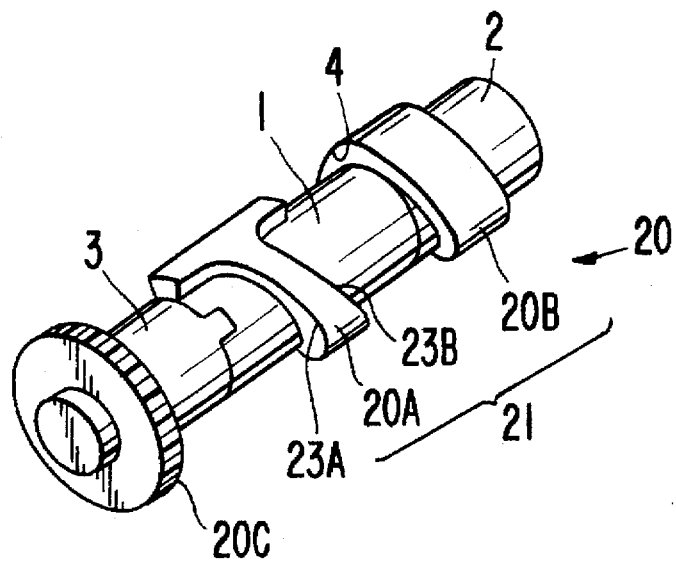
FIG. 2 is a perspective view of a viewfinder cam for use in the zoom-type viewfinder device in accordance with the first preferred embodiment of the present invention.

FIG. 2 is a perspective view of a viewfinder cam 20 for use in the zoom-type viewfinder device in accordance with the first preferred embodiment of the present invention. The viewfinder cam 20 generally comprises a first cam component 1, on which the cam segment 20A is formed, a second cam component 2, on which the cam segment 20B is formed, and a third cam component 3 having a gear 20C secured to its front end. The surface of the cam segment 20A extends one rotation around the cam component 1, that is, the cam segment 20A extends 360 degrees around the circumference of the cam component 1. The cam segment 20B connects with the cam segment 20A when the first cam component 1 is joined with the second cam component 2. The first cam component 1 is joined with the second cam component 2 such that the cam segment 20A and the cam segment 20B are connected by seam 4 to form a continuous cam 21 having a pair of cam bevels 23A and 23B formed on opposite sides thereon.

Figure 3:
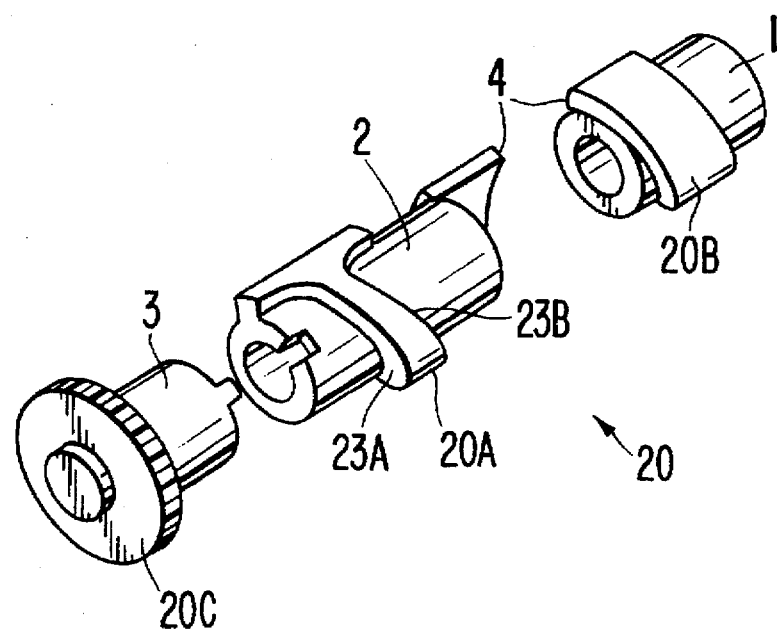
FIG. 3 is an exploded perspective view of the viewfinder cam in accordance with the first preferred embodiment of the present invention.

FIG. 3 is an exploded perspective view of the viewfinder cam 20 in accordance with the first preferred embodiment of the present invention. The first cam component 1, the second cam component 2 and the third cam component 3 are each manufactured separately and assembled together to form a continuous unit. As will be appreciated by one of ordinary skill in the art, the cam 21 is capable of having an extended length of more than one rotation of the cylinder while maintaining a gentle inclination. As a result, even in the case where the cam bevels 23A and 23B extends more than one rotation around the viewfinder cam 20, the first cam component 1 and the second cam component 2 can be manufactured by a method in which they are removed from the cam forming die in the longitudinal direction of the viewfinder cam 20 after the viewfinder cam 20 has been formed by the die.

Figure 4:
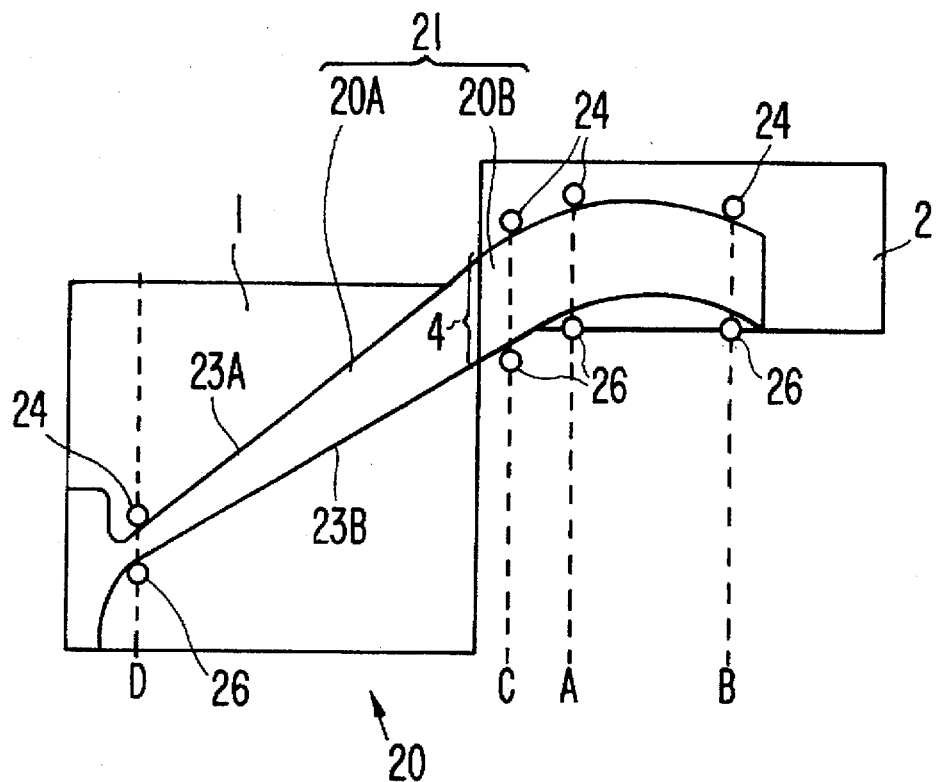
FIG. 4 is an expanded view of the viewfinder cam in accordance with the first preferred embodiment of the present invention.
Figure 5:
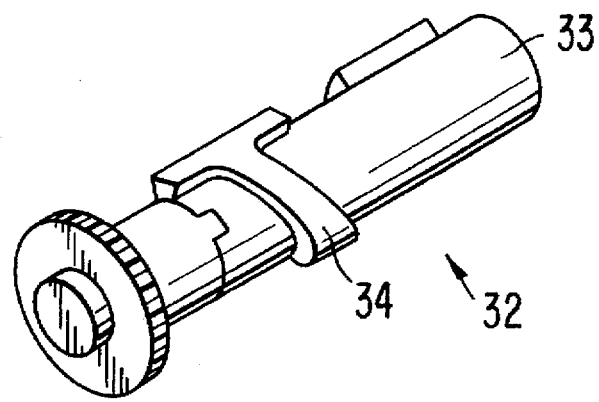
FIG. 5 is a perspective view of a conventional viewfinder cam in accordance with the prior art.
Figure 6:
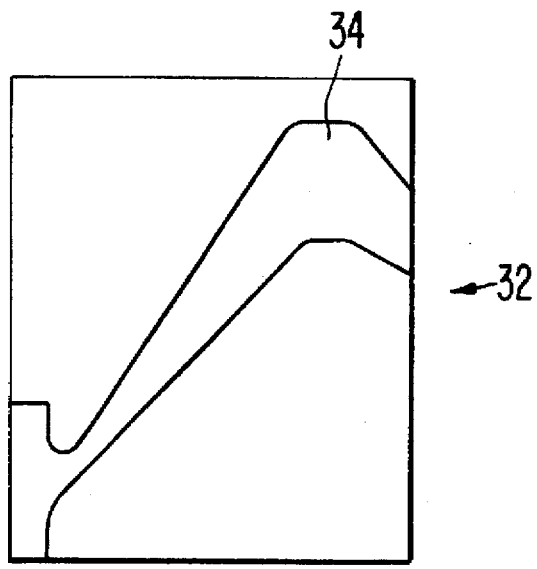
FIG. 6 is an expanded view of a conventional viewfinder cam in accordance with the prior art.

FIG. 4 is an expanded linear view of the cam 21 in accordance with the first preferred embodiment of the present invention. As set forth above, the cam 21, has opposing cam bevels 23A and 23B, which contact the cam pins 24 and 26 respectively. The driving force of the viewfinder cam 20 is transmitted by cam pins 24 and 26 to the first holding rim 16 and the second holding rim 17. In conjunction with the zooming of the photographic zoom lens and lens barrel 22, the viewfinder cam 20 is rotated by means of the gear 22A, via the gear 20C. The cam pins 24 and 26 follow the shapes of the cam bevels 23A and 23B, respectively, causing the first holding rim 16 and the second holding rim 17 to be moved along the optical axis 18. This in turn causes the first group viewfinder lens 12 and the second group viewfinder lens 13 to move inside the viewfinder case, thereby changing the magnification of the viewfinder.

The reset range of the photographic zoom lens is between positions A and B on the cam 21. The range of play in the wide angle range of the photographic zoom lens is between positions A and C on the cam 21. The zooming range of the photographic zoom lens from the wide angle range to the telephoto range is between positions C and D on the cam 21. In other words, when the cam pins 24 and 26 are at the position C, the photographic zoom lens is in the wide angle range, and when the cam pins 24 and 26 are at the position D, the photographic zoom lens is in the fully extended telephoto position.

It will be recognized by one of ordinary skill in the art, that the cam 21, which comprises a first cam component 1 and a second cam component 2, may be provided with cam bevels 23A and 23B which extend more than once around the circumference of the viewfinder cam 20. Further, by manufacturing the viewfinder cam 20 in multiple segments, each segment can be removed from its forming die in the longitudinal direction of the segment, thereby providing smooth zooming resulting in a blur free viewfinder image. In contrast to this, conventional viewfinder cams have, heretofore, only been formed with a single component having a cam 34 contained within the circumference of the viewfinder cam 32. Also, the inclinations of cam bevels 23A and 23B, which are formed on the viewfinder cam 20 in accordance with the first preferred embodiment, can be made more gradual, which reduces the required driving force required of the motor 28. Therefore, a more compact motor can be used for the motor 28, resulting in a more compact camera. Moreover, the power consumption required by the motor 28 is reduced, increasing the life of a camera battery.

Although the first embodiment of the present invention has been described with respect to a specific configuration, it will be recognized that the first embodiment is not limited to the specific configuration. For example, although the first embodiment has been described with respect to a cam 21 of the viewfinder cam 20 being formed on a first cam component 1 and a second cam component 2, one of ordinary skill in the art will recognize that a number of cam components greater than two may be used.

Figure 7:
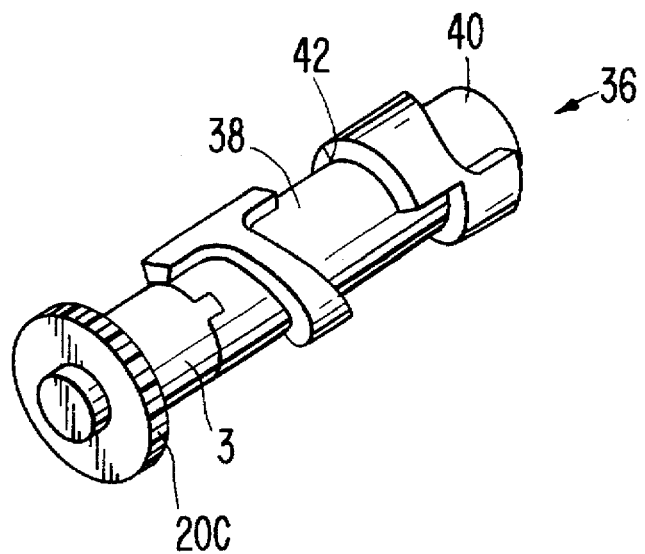
FIG. 7 is a perspective view of a viewfinder cam for use in a zoom-type viewfinder device in accordance with a second preferred embodiment of the present invention.
Figure 8:
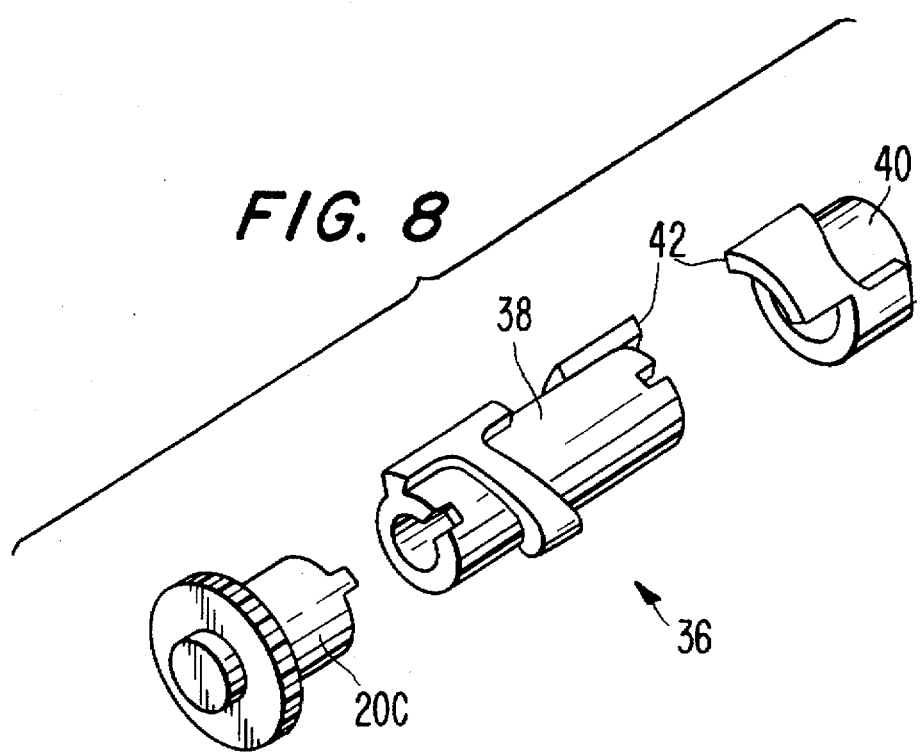
FIG. 8 is an exploded perspective view of the viewfinder cam in accordance with the second preferred embodiment of the present invention.
Figure 9:
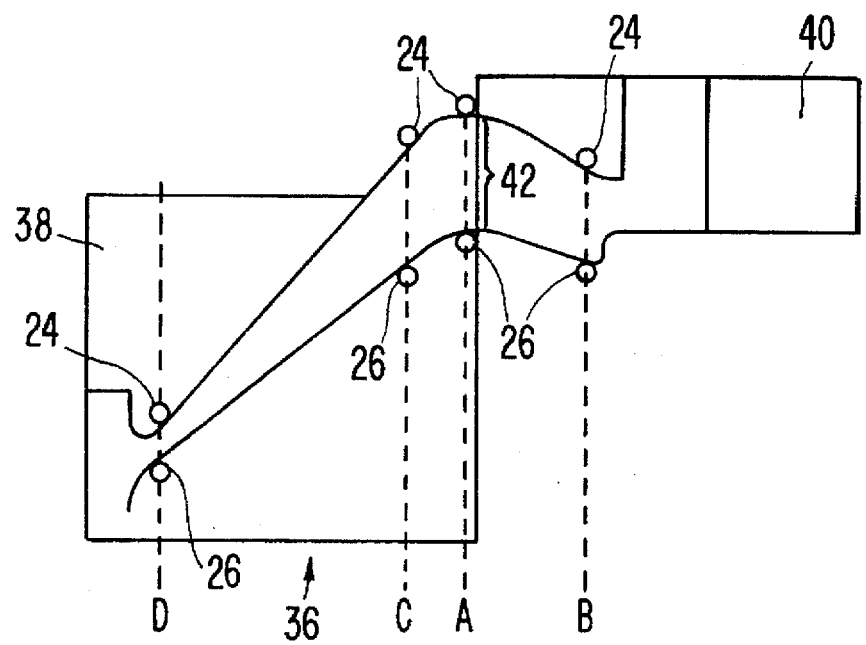
FIG. 9 is an expanded view of the viewfinder cam in accordance with the second preferred embodiment of the present invention.

FIG. 7 is a perspective view of a viewfinder cam 36 in accordance with a second preferred embodiment of the present invention for use in the zoom-type viewfinder device as set forth with respect to the first embodiment of the present invention. A first cam component 38 is jointed to a second cam component 40 creating a seam 42 in the cam. FIG. 8 is an exploded perspective view of the viewfinder cam 36 in accordance with the second preferred embodiment of the present invention. FIG. 9 is an expanded view of the viewfinder cam 36 in accordance with the second preferred embodiment of the present invention.

In accordance with the second preferred embodiment, the seam 42 is positioned between positions A and B on the viewfinder cam 36 in the reset range of the cam. Through this, the cam pins 24 and 26 only pass over the seam 42 as the lens barrel 22 is started from, or enters, its retracted position prior to, or after, zooming. Therefore, during zooming, the cam pins 24 and 26 do not come into contact with the seam 42, and a favorable zoom operation can be achieved without the viewfinder image jumping or becoming blurred.

Although the second embodiment of the present invention has been described with respect to a specific configuration, it will be recognized that the second embodiment is not limited to the specific configuration. For example, although the second embodiment has been described with respect to a viewfinder cam 36 comprising a first cam component 38 and a second cam component 40, one of ordinary skill in the art will recognize that a number of cam components greater than two may be used.

Although a few preferred embodiments of the present invention have been shown and described, it would be appreciated by those skilled in the art that changes may be made in these embodiments without departing from the principles and spirit of the invention, the scope of which is defined in the claims and their equivalents.

In a viewfinder cam for a zoom-type viewfinder device, in accordance with the preferred embodiments of the present invention, the cam bevel is formed from at least two cam components. Through this, even when the cam bevel extends around the viewfinder cam for more than one rotation, that is, more than 360 degrees, it can be manufactured by die forming wherein the viewfinder cam is removed from a die in the longitudinal direction of the viewfinder cam after the viewfinder cam has been formed by the die. Because of the extended length of the cam bevel, the inclination of the cam bevel can be made more gradual, such that a smaller driving force is required. As a result, a compact motor can be used, allowing the camera to become more compact. Further, as the length of the cam bevel can extend more than once around the outer circumference of the cylinder, which constitutes the viewfinder cam, the viewfinder cam can be made smaller in diameter, allowing the camera to become even more compact. Moreover, in accordance with the second preferred embodiment of the present invention the seam between the cam components can be positioned such that the cam pins pass over the seam while the photographic zoom lens is in the reset position, such a smooth zoom operation can be achieved throughout the zooming positions.

What is claimed is:

1. A zoom-type viewfinder for use with a photographic zoom lens comprising:
    at least one viewfinder lens having a cam pin dependent therefrom;
    a viewfinder cam assembly having a cam extending around the circumference of the viewfinder cam assembly, the cam having at least one cam bevel engaging the cam pin dependent from the at least one viewfinder lens so as to drive the at least one viewfinder lens to change the magnification of the zoom-type viewfinder, the viewfinder cam assembly including
    a first cam component having a first cam segment forming a first part of the cam; and
    a second cam component connected to said first cam component, said second cam component having a second cam segment forming a second part of the cam.

2. A zoom-type viewfinder, as set forth in claim 1, wherein said viewfinder cam assembly further comprises:
    a third cam component connected to said second cam component, said third cam component having a third cam segment forming a third part of the cam.

3. A zoom-type viewfinder, as set forth in claim 1, wherein said at least one viewfinder lens comprises a first viewfinder lens and a second viewfinder lens, and the cam has a first cam bevel and a second cam bevel, the cam pin of said first viewfinder lens engaging the first cam bevel and the cam pin of the second viewfinder lens engaging the second cam bevel.

4. A zoom-type viewfinder, as set forth in claim 3, wherein the first cam bevel is provided on an opposite side of the cam from the second cam bevel.

5. A zoom-type viewfinder, as set forth in claim 4, further comprising:
    a biasing spring extending from said first viewfinder lens to said second viewfinder lens to bias the cam pin dependent from the first viewfinder lens against the first cam bevel and to bias the cam pin dependent the second viewfinder lens against the second cam bevel.

6. A zoom-type viewfinder, as set forth in claim 1, wherein said viewfinder cam assembly further comprises:
    a gear component connected to said first cam component, said gear component having a gear which meshes with a gear on said photographic zoom lens so as to cause the viewfinder cam assembly to rotate with the photographic zoom lens.

7. A zoom-type viewfinder, as set forth in claim 1, wherein the cam has a first portion corresponding to a reset position of the photographic zoom lens, a second portion corresponding to a wide angle position of the photographic zoom lens, and a third portion corresponding to the zoom position of the photographic zoom lens.

8. A zoom-type viewfinder, as set forth in claim 7, wherein the seam between the first part of the at least one cam bevel and the second part of the at least one cam bevel is positioned in the first portion of the cam bevel.

9. A zoom-type viewfinder for use with a photographic zoom lens comprising:
    a first viewfinder lens having a cam pin dependent therefrom;
    a second viewfinder lens having a cam pin dependent therefrom;
    a viewfinder cam assembly having a cam extending around the circumference of the viewfinder cam assembly, the cam having a first and second cam bevel, the first cam bevel engaging the cam pin dependent from the first viewfinder lens so as to drive the first viewfinder lens and the second cam bevel engaging the cam pin dependent from the second viewfinder lens so as to drive the second viewfinder, the viewfinder cam assembly including
    a first cam component having a first cam segment forming a first part of the cam, the first part of the cam extending once around said viewfinder cam assembly;
    a second cam component connected to said first cam component, said second cam component having a second cam segment forming a second part of the cam, the second part of the cam being continuous with the first part of the cam; and
    a gear component connected to said first cam component so as to rotate with said first and second cam components, said gear component having a gear which meshes with a gear on said photographic zoom lens so as to cause the viewfinder cam assembly to rotate in relation to a rotation of the photographic zoom lens.

10. A zoom-type viewfinder, as set forth in claim 9, wherein the cam is not broken by a joint between said first cam component and said gear component.

11. A zoom-type viewfinder, as set forth in claim 9, wherein the first cam bevel is provided on an opposite side of the cam from the second cam bevel.

12. A zoom-type viewfinder, as set forth in claim 11, wherein the first cam bevel is a straight bevel and the second cam bevel is a curved bevel.

13. A zoom-type viewfinder, as set forth in claim 12, wherein the cam pin on said first viewfinder is positioned on the first cam bevel when the photographic zoom lens is positioned so as to be able to create an image.

14. A zoom-type viewfinder, as set forth in claim 11, further comprising:
    a biasing spring extending from said first viewfinder lens to said second viewfinder lens to bias the cam pin dependent from the first viewfinder lens against the first cam bevel and to bias the cam pin dependent the second viewfinder lens against the second cam bevel.

15. A zoom-type viewfinder, as set forth in claim 11, wherein the cam is provided with a stopping section to halt the movement of the cam pins on said first and second viewfinder lenses.

16. A cam comprising:
    a first cam component having a first cam segment forming a first part of an at least one cam bevel; and a second cam component connected to said first cam component, said second cam component having a second segment forming a second part of the at least one cam bevel, the second cam segment overlapping said first cam component.

17. A cam, as set forth in claim 16, wherein said cam further comprises:

a third cam component connected to said second cam component, said third cam component having a third cam segment forming a third part of the at least one cam bevel.

18. A cam, as set forth in claim 16, wherein said cam further comprises:

a gear component connected to said first cam component.

* * * * *

UNITED STATES PATENT AND TRADEMARK OFFICE
CERTIFICATE OF CORRECTION

PATENT NO. : 5,678,090

DATED : October 14, 1997

INVENTOR(S) : Tomoki NISHIMURA et al.

It is certified that error appears in the above-identified patent and that said Letters Patent is hereby corrected as shown below:

Title Page, under Abstract, line 8, delete "of" (first occurrence);
FIG. 3, delete reference numeral "1" and insert therefor --2--; and
delete previous reference numeral "2" and insert therefor --1--.

Signed and Sealed this

Seventh Day of April, 1998

Attest:

BRUCE LEHMAN

*Attesting Officer*    *Commissioner of Patents and Trademarks*